United States Patent
Sloan

(10) Patent No.: US 6,179,205 B1
(45) Date of Patent: Jan. 30, 2001

(54) SYSTEM AND METHOD FOR LOCKING AND UNLOCKING AND APPLICATION IN A SMART CARD

(75) Inventor: Jerry F. Sloan, Saratoga, CA (US)

(73) Assignee: Visa International Service Association, Foster City, CA (US)

(*) Notice: Under 35 U.S.C. 154(b), the term of this patent shall be extended for 0 days.

(21) Appl. No.: 09/035,647

(22) Filed: Mar. 5, 1998

(51) Int. Cl.[7] ........................................ G06K 5/00

(52) U.S. Cl. .......................... 235/382; 235/379; 902/4

(58) Field of Search .......................... 235/379, 380, 235/382, 382.5; 902/1, 2, 4, 26; 713/202; 705/41, 44

(56) References Cited

U.S. PATENT DOCUMENTS

| | | | |
|---|---|---|---|
| 4,630,201 | * 12/1986 | White | 235/379 X |
| 4,656,342 | * 4/1987 | Ugon | 235/379 |
| 4,746,788 | * 5/1988 | Kawana | 235/380 |
| 5,065,155 | 11/1991 | Oogita et al. | 340/825.56 |
| 5,266,782 | * 11/1993 | Alanara et al. | 235/380 |
| 5,379,344 | * 1/1995 | Larsson et al. | 235/380 X |
| 5,698,836 | * 12/1997 | Fujioka | 235/492 |
| 5,854,976 | * 12/1998 | Garcia Aguilera et al. | 455/411 |
| 5,873,100 | * 2/1999 | Adams et al. | 707/204 |
| 5,987,438 | * 11/1999 | Nakano et al. | 705/41 |
| 6,044,470 | * 3/2000 | Kuriyama | 713/202 |

FOREIGN PATENT DOCUMENTS

| | | |
|---|---|---|
| 36 32 294 | 4/1988 | (DE). |
| 2637710 | 4/1990 | (FR). |
| 2665279 | 1/1992 | (FR). |
| WO 91/10971 | 7/1991 | (WO). |
| WO 94/17498 | 8/1994 | (WO). |

OTHER PUBLICATIONS

Carol Hovenga Fancher, "In Your Pocket SmartCard", Feb. 1997, IEEE Spectrum.
Chaum et al., "SmartCard 2000: The Future of IC Cards", Oct. 19, 1987, Elsevier Science Publishers, B.V.
Steven Levy, "E–Money (That's What I Want)", Dec. 1994, Wired Magazine.
Carol H. Fancher, "Smart Cards as Potential Applications Grow, Computers in the Wallet are Making Unobstrusive Inroads", Aug. 1996, Scientific American Website.

(List continued on next page.)

Primary Examiner—Karl D. Frech
Assistant Examiner—Jared J. Fureman
(74) Attorney, Agent, or Firm—Beyer Weaver & Thomas, LLP

(57) ABSTRACT

Locking and unlocking an application in a smart card allows for automatic authenticity of a lock or unlock command without the need for a personal identification number (PIN). The smart card is locked and unlocked by using a smart card device that need not have a keypad. The smart card device is a dedicated reader and locking/unlocking device, or can be a bank terminal, PC, telephone, etc. The smart card is inserted into the smart card device. A lock command is sent from the device to the smart card. An application on the smart card is locked. The smart card sends identifying information, such as a password and a card identification number, to the device which is stored in a cache. The identifying information allows automatic authentication for unlocking of the card at a later time. The locked application cannot be used until it is unlocked. To unlock, the smart card is inserted into the device and an unlock button is pressed. The smart card device reads the card identification number of the card and determines if the corresponding password for that card is present in the cache of the device. If so, an unlock command is issued to the smart card along with the password. If the password received by the smart card matches the password of the smart card then the smart card is unlocked.

15 Claims, 11 Drawing Sheets

OTHER PUBLICATIONS

Jerome Svigals, "SmartCards The New Bank Cards", 1985, MacMillan Publishing Company. No Month Available.

Roy Bright, "SmartCards: Principles, Practice, Applications", Ellis Horwood Limited. 1988, No Month Available.

Jerome Svigals, "SmartCards The Ultimate Personal Computer", 1985, MacMillan Publishing Company. No Month Available.

Hawkes et al., "Integrated Circuit Cards, Tags and Tokens", 1990, BSP Professional Books. No Month Available.

Hiro Shogase, The Very Smart Card: A Plastic Packet Bank:, Oct. 1988, IEEE Spectrum.

David Naccache, "Cryptographic Smart Cards", Jun. 3, 1996, IEEE Micro 1996 Website.

Zoreda et al., "Smart Cards", 1994, Artech House. No Month Available.

"Identification Card Systems—Inter–Sector Electronic Purse Part I: Concepts and Structures", Oct. 1994, European Standard, prEN 1546.

"Identification Card Systems—Inter–Sector Electronic Purse Part 2: Security Architecture", Jan. 1994, European Standard, prEN XXXXX–2.

"Identification Card System—Inter–Sector Electronic Purse Part 3: Data Elements and Interchanges", Dec. 1994, European Prestandard, prEN 1546–3.

"Identification Card System—Inter–Sector Electronic Purse Part 4: Devices", Oct. 1994, European Prestandard, prEN 1546–4.

"Identification Cards—Integrated Circuit(s) Cards With Contacts Part 1: Physical Characteristics", Jul. 1987, International Standard, ISO 7816–1, First Edition.

"Identification Cards—Integrated Circuit(s) Cards With Contacts Part 2: Dimensions and Location of the Contacts", May 1988, International Standard, ISO 7816–2, First Edition.

"Identification Cards—Integrated Circuit(s) Cards With Contacts Part 3: Electronic Signals and Transmission Protocols", Sep. 1989, International Standard, ISO/IEC 7816–3, First Edition.

"Identification Cards—Integrated Circuit(s) Cards with Contacts Part 4: Inter–Industry Commands for Interchange", Jul. 1994, International Standard, ISO/IEC 7816–4, First Edition.

"Identification Cards—Integrated Circuit(s) Cards With Contacts Part 5: Numbering System and Registration Procedure for Application Identifiers", Mar. 1993, International Standard, ISO/IEC DIS 7816–5.

"International Cards—Integrated Circuit(s) Cards With Contact Part 6: Inter–Industry Data Elements", Jul. 1995, International Standard, ISO/IEC DIS 7816–6.

"Bank Cards—Magnetic Stripe Data Content For Track 3", Jul. 1987, International Standard, ISO 4909 Second Edition.

"Identification Cards—Physical Characteristics", Aug. 1995, International Standard, ISO/IEC 7810, Second Edition.

"Identification Cards—Recording Technique—Part 1: Embossing", Aug. 1995, International Standard, ISO/IEC 7811–1, Second Edition.

"Identification Cards—Recording Technique—Part 2: Magnetic Strip", Aug. 1995, International Standard, ISO/IEC 7811–2, Second Edition.

"Identification Cards—Recording Technique—Part 3: Location of Embossed Characters on ID–1 Cards", Aug. 1995, International Standard, ISO/IEC 7811–3, Second Edition.

"Identificaiton Cards—Recording Technique—Part 4: Location of Read–Only Magnetic Tracks—Tracks 1 & 2", Aug. 1995, International Standard, ISO/IEC 7811–4, Second Edition.

"Identification Cards—Recording Technique—Part 5: Location of Read–Write Magnetic Track—Track 3", Aug. 1995, International Standard, ISO/IEC 7811–5, Second Edition.

"Identification Cards—Recording Technique—Part 6: Magnetic Stripe–High Coercivity", Apr. 1996, International Standard, ISO/IEC 7811–6, First Edition.

"Identification Cards—Financial Transaction Cards", Jun. 1990, International Standard, ISO/IEC 7813, Third Edition.

"Identification Cards—Financial Transaction Cards Amendment 1" Dec. 1996, International Standard, ISO/IEC 7813, Fourth Edition.

"Identification Cards—Contactless Integrated Circuit(s) Cards—Part 1: Physical Characteristics", Sep. 1992, International Standard, ISO/IEC 10536–1, First Edition.

"Identification Cards—Contactless Integrated Circuit(s) Cards—Part 2: Dimensions and Locations of Coupling Areas", Dec. 1995, International Standard, ISO/IEC 10536–2, First Edition.

"Identification Cards—Contactless Integrated Circuit(s) Cards—Part 3: Electronic Signals and Reset Procedures", Dec. 1996, International Standard, ISO/IEC 10536–3, First Edition.

* cited by examiner

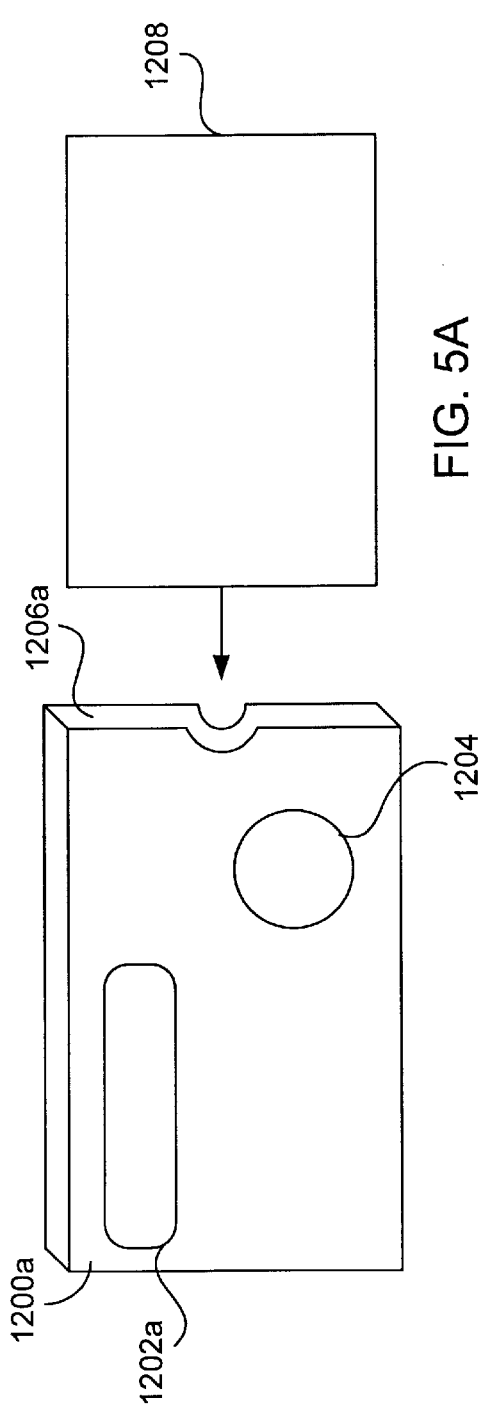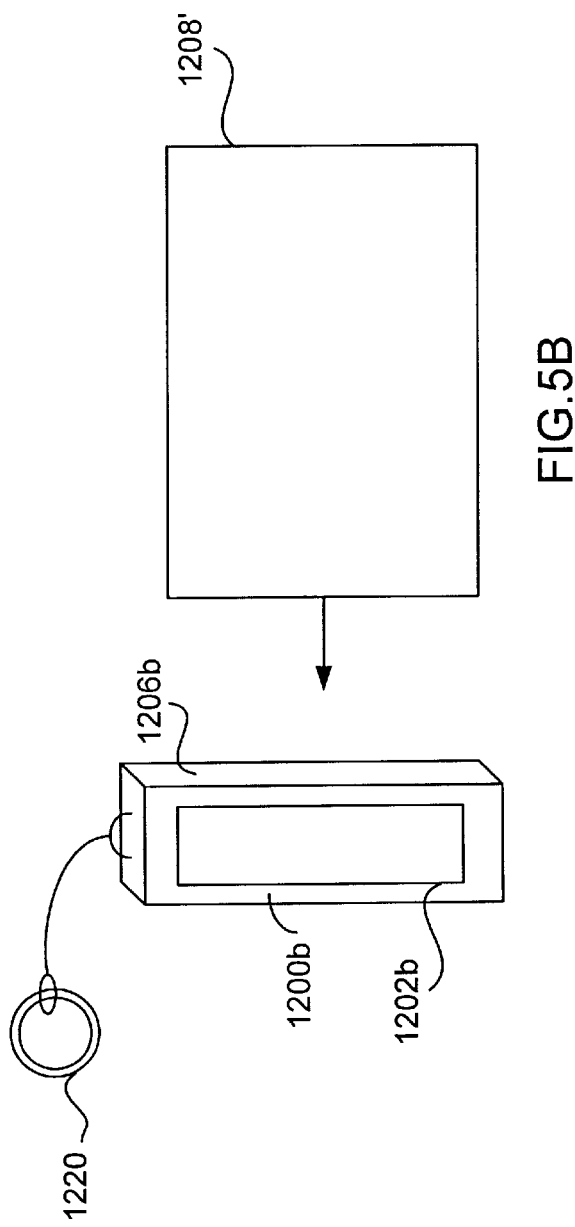

CACHE

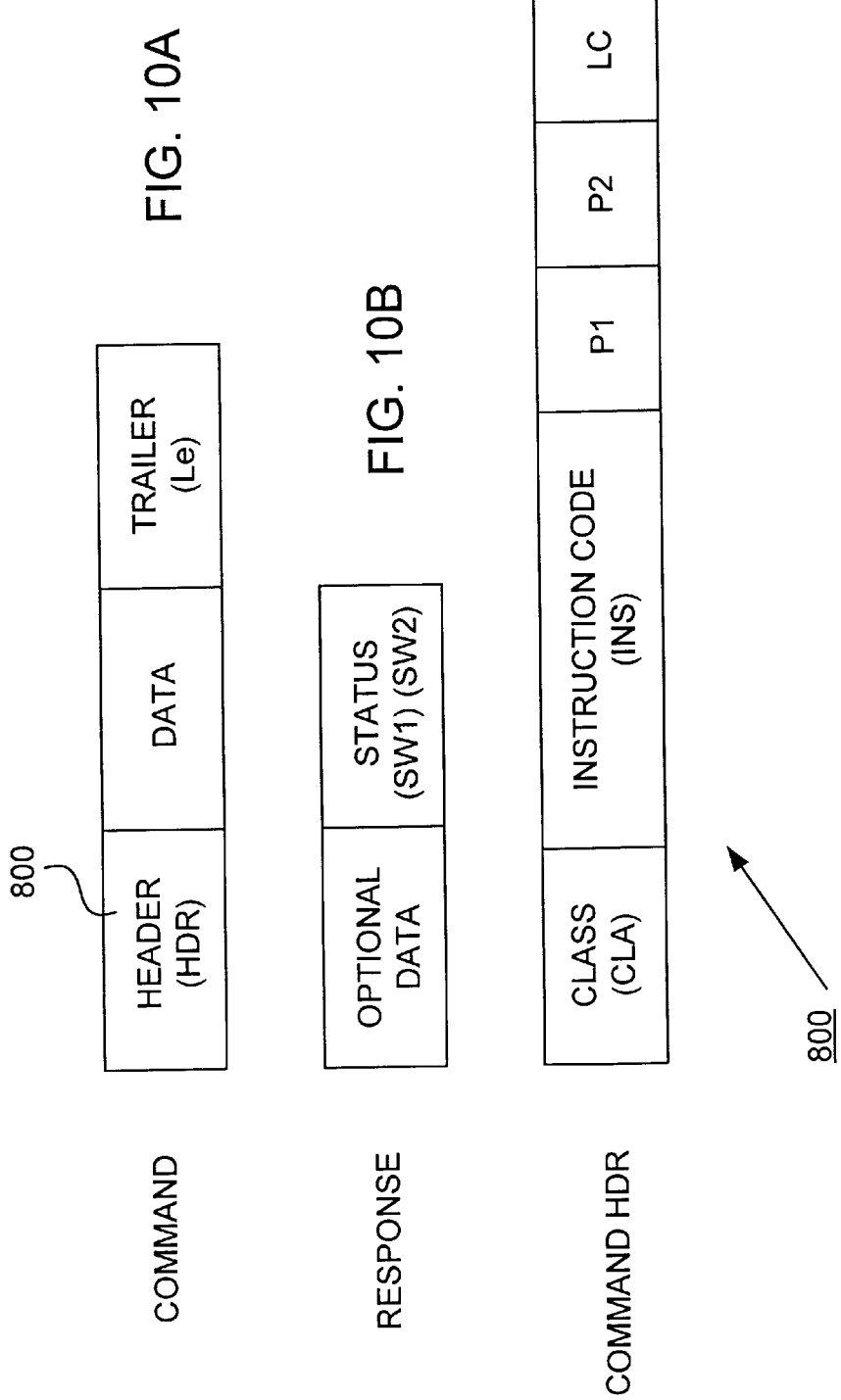

COMMAND LOCK

|  | CONTENT | LENGTH |
|---|---|---|
| CLA | '80' | 1 |
| INS | TBD | 1 |
| P1 | '00' | 1 |
| P2 | '00' | 1 |

FIG. 11A

RESPONSE LOCK

| RESPONSE DATA | LENGTH |
|---|---|
| CARD ID | 5 |
| PASSWORD | 3 |

FIG. 11B

RETURN CODES

| SW1  SW2 | MEANING |
|---|---|
| '9000' | SUCCESSFUL OPERATION |
| '9110' | APPLICATION LOCKED |

FIG. 11C

COMMAND LOCK

|  | CONTENT | LENGTH |
|---|---|---|
| CLA | '80' | 1 |
| INS | TBD | 1 |
| P1 | '00' | 1 |
| P2 | '00' | 1 |
| LC | '03' | 1 |
|  | PASSWORD | 3 |

FIG. 13A

RETURN CODES

| SW1  SW2 | MEANING |
|---|---|
| '9000' | SUCCESSFUL OPERATION |
| '9111' | APPLICATION WAS ALREADY UNLOCKED |
| '9112' | UNABLE TO UNLOCK |

FIG. 13B

SYSTEM AND METHOD FOR LOCKING AND UNLOCKING AND APPLICATION IN A SMART CARD

FIELD OF THE INVENTION

The present invention relates generally to smart card transactions, more particularly, to a system and method for locking and unlocking an application in a smart card.

BACKGROUND OF THE INVENTION

A smart card is typically a credit card-sized plastic card that includes a semiconductor chip capable of holding data supporting multiple applications. One popular such application is the holding of the digital equivalent of cash directly, instead of pointing to an account or providing credits. Accordingly, smart cards with such an application are also sometimes referred to as stored-value cards. When a card of this kind is used to make a purchase, the digital equivalent of cash is transferred to the merchant's "cash register" and then to a financial institution. Stored-value cards are either replenishable (value can be reloaded onto the card using a terminal) or non-replenishable (the card is decremented in value for each transaction and thrown away when all its value is gone).

Physically, a smart card often resembles a traditional "credit" card having one or more semiconductor devices attached to a module embedded in the card, providing contacts to the outside world. The card can interface with a point-of-sale terminal, an ATM, or a card reader integrated into a telephone, a computer, a vending machine, or any other appliance. A micro-controller semiconductor device embedded in a "processor" smart card allows the card to undertake a range of computational operations, protected storage, encryption and decision making. Such a micro-controller typically includes a microprocessor, memory, and other functional hardware elements. Various types of cards are described in "The Advanced Card Report: Smart Card Primer", Kenneth R. Ayer and Joseph F. Schuler, The Schuler Consultancy, 1993.

One example of a smart card implemented as a processor card is illustrated in FIG. 1. Of course, a smart card may be implemented in many ways, and need not necessarily include a microprocessor or other features. The smart card may be programmed with various types of functionality, including applications such as stored-value; credit/debit; loyalty programs, etc. For the purpose of this disclosure, card 5 is programmed with at least one application such as stored value application, and may be referred to as "stored-value" card 5.

Stored-value card 5 has an embedded micro-controller 10 that includes a microprocessor 12, random access memory (RAM) 14, read-only memory (ROM) 16, non-volatile memory 18, an encryption module 22, and a card reader interface 24. Other features of the micro-controller may be present but are not shown, such as a clock, a random number generator, interrupt control, control logic, a charge pump, power connections, and interface contacts that allow the card to communicate with the outside world.

Microprocessor 12 is any suitable central processing unit for executing commands and controlling the device. RAM 14 serves as storage for calculated results and as stack memory. ROM 16 stores the operating system, fixed data, standard routines, and look up tables. Non-volatile memory 18 (such as EPROM or EEPROM) serves to store information that must not be lost when the card is disconnected from a power source but that must also be alterable to accommodate data specific to individual cards or any changes possible over the card lifetime. This information might include a card identification number, a personal identification number, authorization levels, cash balances, credit limits, etc. Encryption module 22 is an optional hardware module used for performing a variety of encryption algorithms. Card reader interface 24 includes the software and hardware necessary for communication with the outside world. A wide variety of interfaces are possible. By way of example, interface 24 may provide a contact interface, a close-coupled interface, a remote-coupled interface, or a variety of other interfaces. With a contact interface, signals from the micro-controller are routed to a number of metal contacts on the outside of the card which come in physical contact with similar contacts of a card reader device.

A smart card can include multiple applications, including, for example, applications such as credit, debit, stored value, telephone, or loyalty. Given such a multi-application smart card, a problem could arise when the smart card is given to a service provider for a single transaction. For example, the owner of the smart card may give the smart card to a waiter in a restaurant for a credit transaction. However, without a means for locking the other applications, such as the stored value or telephone applications, the waiter has access to all of the applications, such that the waiter could possibly make phone calls or conduct stored value transactions with the smart card during the time it is in his possession.

A solution to this problem includes the use of a device, commonly referred to as an "electronic wallet", into which a smart card can be inserted and a particular application can be locked such that a particular application cannot be used until it is unlocked. Some smart card companies, such as Mondex International, currently utilize a wallet which can lock and unlock a smart card. The locking and unlocking mechanism utilizes a personal identification number (PIN) to ensure authenticity of the lock or unlock request. However, many people prefer not to use PINs. It is a nuisance to have to memorize a PIN, particularly if the person already has several PINs memorized. Additionally, a particular PIN can be forgotten or confused with another PIN. Further, the need for a PIN requires that the "electronic wallet" device has at least a numeric key pad to enter the PIN. This is undesirable for some users who do not want to carry a relatively bulky wallet with them.

What is needed is a system and method for automatically ensuring authenticity for locking and unlocking an application in a smart card which does not require the user to memorize a PIN. Preferably, the system and method may be implemented using a device which does not require the use of a bulky and expensive keypad. The present invention addresses such a need.

SUMMARY OF THE INVENTION

The present invention provides a system and method for locking and unlocking an application in a smart card. The system and method according to the present invention allows for automatic determination of the authenticity of a lock or unlock command without the need for a personal identification number. The smart card can be locked and unlocked by utilizing a smart card device. The smart card can be inserted into the smart card device to lock at least one application of the smart card such that the locked application cannot be utilized until it is unlocked. During the locking process, the smart card sends identifying information, such as a password and card ID, to the smart card device to allow automatic authentication for unlocking of the card at a later time. A password is herein meant to include a combination of characters which can include letters, numbers, and various symbols.

To unlock an application in a smart card, the smart card device identifies the card and looks for the password corresponding to this particular card. If the password is found in the smart card device's cache memory, then the password and an "unlock" command are issued from the smart card device to the smart card. When the smart card device receives the password along with the unlock command, it is determined whether the received password matches the actual password for the smart card. If the passwords match, then the application is unlocked.

A system and method according to the present invention for locking and unlocking an application in a smart card uses a smart card device. The method for unlocking the application comprises the steps of automatically determining a first password; determining whether the first password matches a second password; and unlocking the application if the first password matches the second password. Further, the method according to the present invention for locking the application comprises the steps of sending a command to lock the application in the smart card; sending smart card identifying information to a smart card device; and locking the application in the smart card.

BRIEF DESCRIPTION OF THE DRAWINGS

The invention, together with further advantages thereof, may best be understood by reference to the following description taken in conjunction with the accompanying drawings in which:

FIGS. 5A and 5B show examples of a smart card device according to embodiments of the present invention.

FIGS. 10A–10C depict the International Standards Organization format for the command, response, and command header for information conveyed to and from the smart card.

FIGS. 11A–11C are tables illustrating examples of the command, response, and return codes for the lock application command.

FIGS. 13A–13B show tables describing the command and return codes for the unlock command.

DETAILED DESCRIPTION OF THE INVENTION

While this invention is described in terms of several preferred embodiments, it is contemplated that alternatives, modifications, permutations and equivalents thereof will become apparent to those skilled in the art upon a reading of the specification and study of the drawings.

Figure 1:
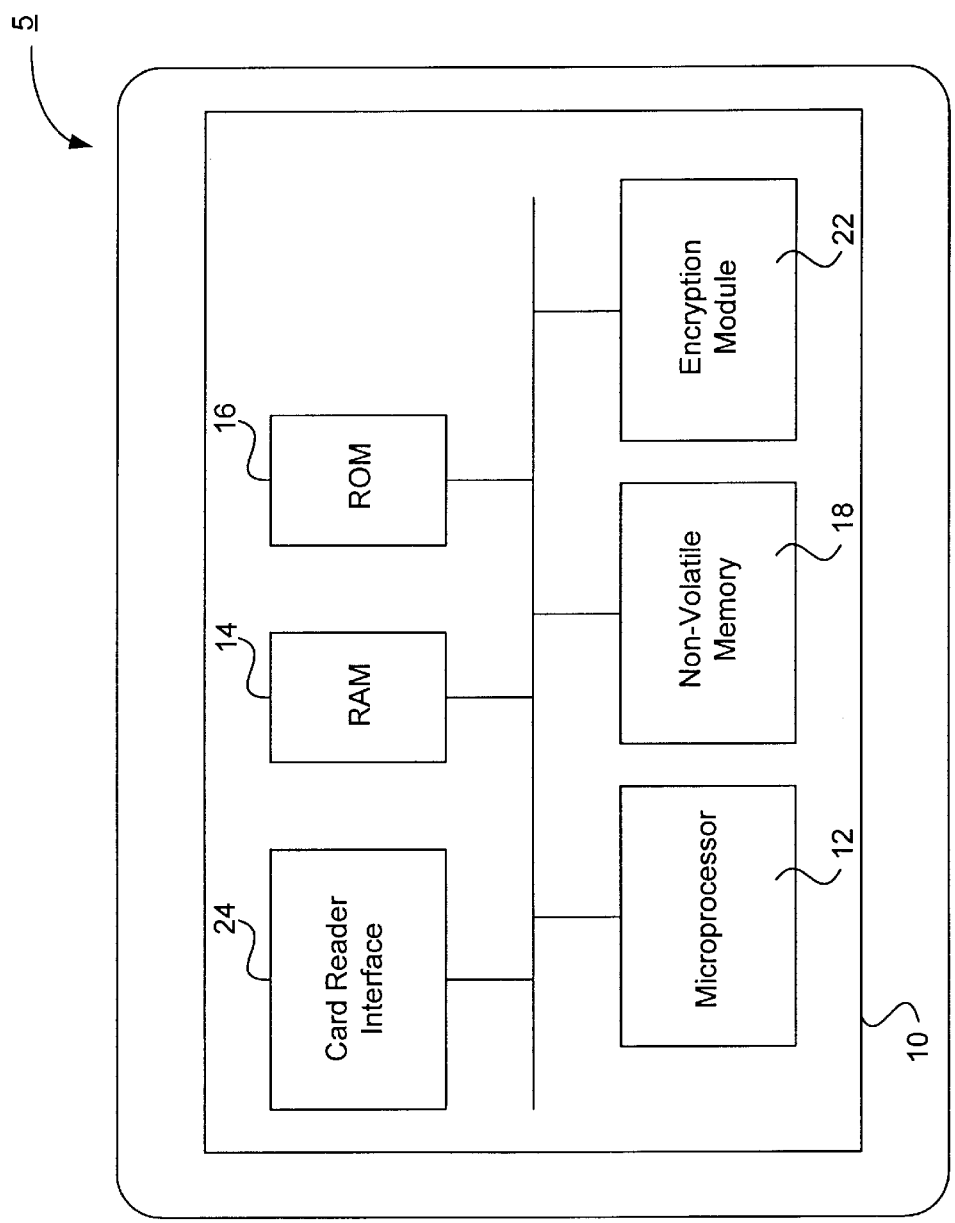
FIG. 1 is a block diagram of an example of a conventional smart card.
Figure 2:
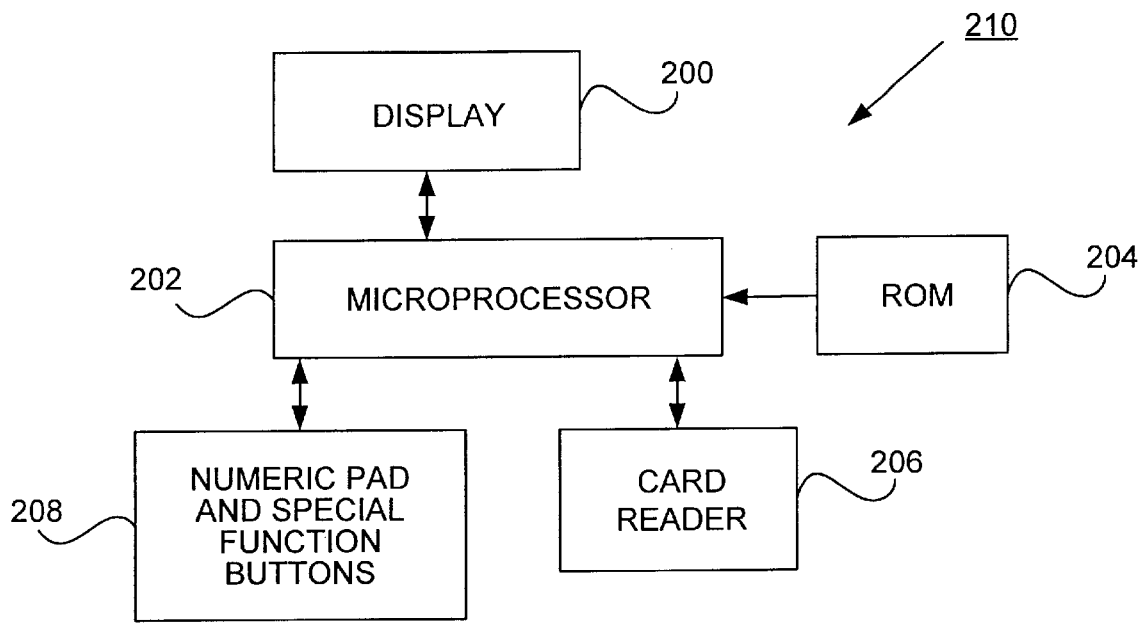
FIG. 2 is a block diagram of a conventional wallet.

FIG. 2 shows a block diagram of a conventional electronic wallet 210. This example of a conventional wallet includes a display 200, a microprocessor 202, a read only memory (ROM) 204, a card reader 206, and a numeric pad with special function buttons 208. Typically, a user can insert a smart card into a wallet such as that shown in FIG. 2 and information, such as the amount of value remaining in a stored value application of the card, can be displayed on the display 200. The numeric pad and special function buttons 208 can be used by the user to input a PIN in order to access the information. Numeric pad and special function buttons 208 may also include a "lock" button (not shown) for locking a card. A separate "unlock" button may also be included or it may be the same button as the "lock" button.

Figure 3:
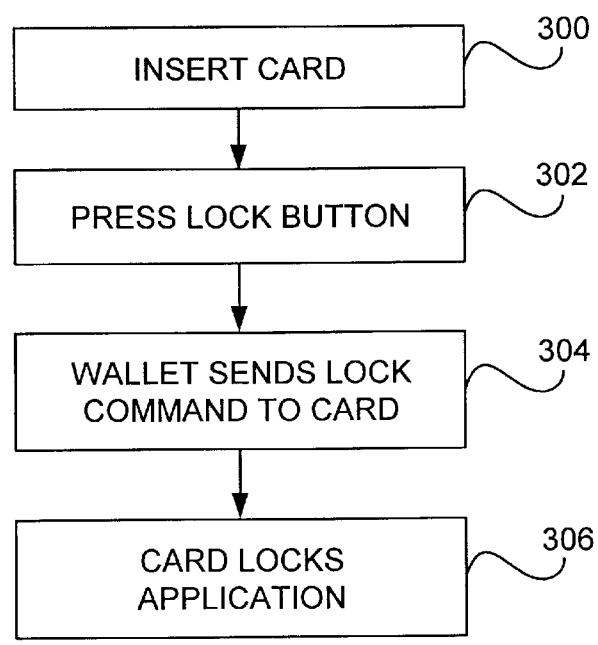
FIG. 3 is a flow diagram of a conventional method for locking an application in a smart card.

FIG. 3 shows a flow diagram of a conventional method for locking an application in a smart card. The smart card is inserted into a device such as an electronic wallet, an automated teller machine (ATM), or an input device to a computer system. In this example, a conventional electronic wallet 210 will be used. A lock button is pressed by the user (step 302) and wallet 210 sends a lock command to the smart card (step 304). The smart card, in response to the lock command, then locks an application in the smart card (step 306).

Figure 4:
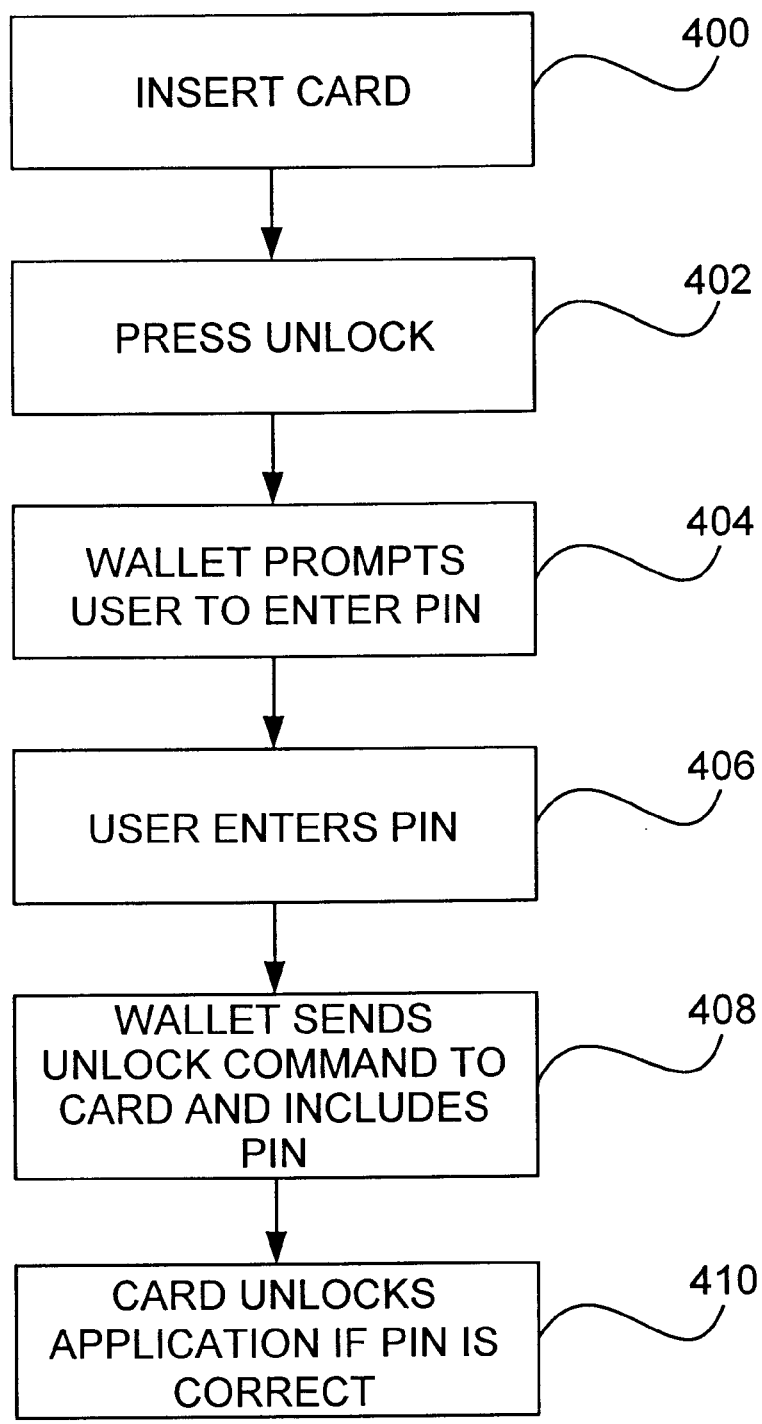
FIG. 4 is a flow diagram of a conventional method for unlocking an application in a smart card.

FIG. 4 shows a flow diagram of a conventional method for unlocking an application in a smart card. The smart card is inserted into an electronic wallet (e.g., wallet 210) (step 400), and an unlock button is then pressed (step 402). The wallet typically prompts the user to enter a PIN (step 404). The user then enters the PIN (step 406). The wallet sends an unlock command to the smart card wherein the PIN is included in the unlock command (step 408). The smart card then unlocks an application in step 410 if the PIN sent by the wallet is correct.

One of the problems with these conventional methods of locking and unlocking an application for a smart card as described in FIGS. 3 and 4, is that the user is required to memorize a personal identification number (PIN). Many people find having to memorize a PIN a nuisance. This nuisance can be further compounded by the need to keep track of a number of different PINs for, e.g., a bank account, a password at work, etc. The user may choose to have a different PIN for every different type of transaction which requires a PIN, or select a single PIN to apply to all transactions in his life. However, if the user is required to memorize numerous PINs for numerous activities, then the user also needs to remember which PIN applies to which transaction. If the user selects a single PIN for all of his transactions, then the user has a higher risk of exposing his PIN. This problem may become even greater if different applications on a single smart card require different PINs.

Accordingly, what is needed is a system and method for locking and unlocking an application in a smart card which does not require the user to memorize a PIN. Embodiments of the present invention address such a need.

The method and system according to embodiments of the present invention provides a lock/unlock feature of an application in a smart card wherein the transaction is automatically authenticated. Additionally, embodiments of the present invention provide the ability to lock/unlock an application, such as a stored value application (sometimes referred to as a "purse"), using one of a plurality of smart card devices which can lock/unlock a particular smart card.

An application in a particular smart card may also be locked with a first one of a plurality of smart card devices and unlocked with a second one of the plurality of smart card devices. In one embodiment of the present invention, the issuer of the smart card can also unlock an application in a smart card if a smart card device is unable to do so. For example, in one embodiment, the smart card issuer can look up or regenerate the unique password assigned to the particular smart card and have it downloaded to a terminal device, such as the cardholder's personal computer system.

FIGS. 5A and 5B show examples of two embodiments of smart card devices 1200a and 1200b according to the present invention. Smart card device 1200a is shown to be approximately a little larger than the smart card 1208. Smart card device 1200a includes a display 1202a, at least one function button 1204, and a card slot 1206a. Display 1202a can be used to display card value amounts such as monetary value or credit value, or other information such as the last ten transactions performed by the smart card, or the like. Special function button 1204 can be a button dedicated for use in issuing a lock command or an unlock command. Alternatively, special function button 1204 can represent more than one function, for instance button 1204 can be pressed twice for unlock and once for lock. Smart card device 1200a also includes a slot 1206a into which smart card 1208 is inserted. Another possible example is to have smart card device 1200b attached to a key chain 1220. This type of smart card device would still include a display 1202b and an insert slot 1206b. Smart card 1208' can simply be partially inserted into smart card device 1200b and the pressure of the insertion of smart card 1208' against internal contacts (not shown) can initiate functions such as a lock or unlock command.

Figure 6:
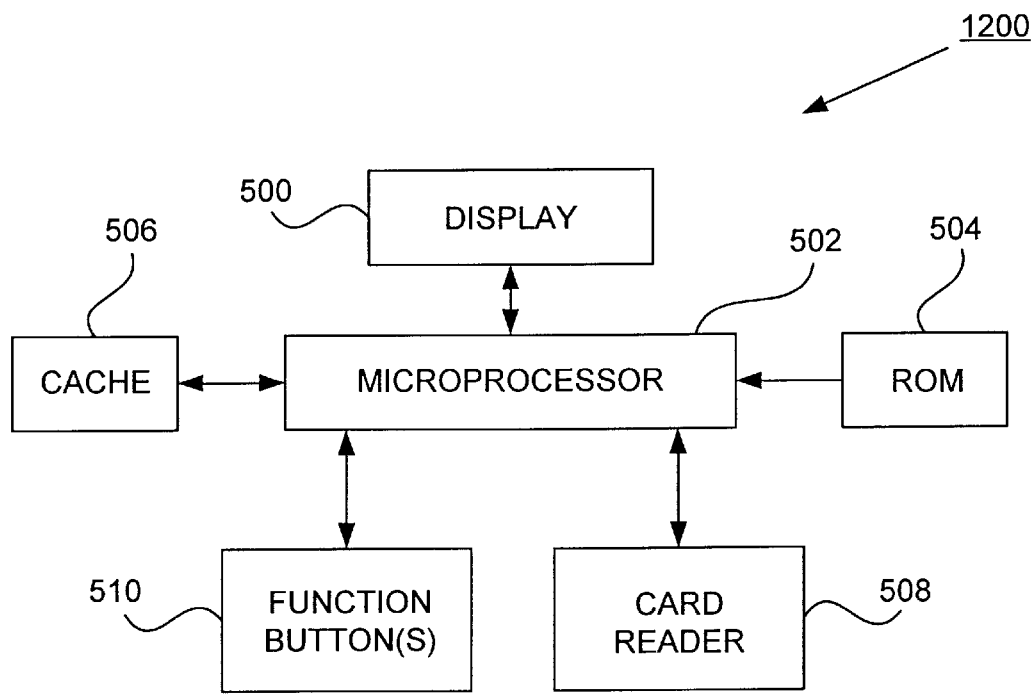
FIG. 6 is a block diagram of a smart card device according to an embodiment of the present invention.

FIG. 6 is a block diagram of a smart card device according to an embodiment of the present invention. It shows a microprocessor 502 coupled with a display 500, a memory such as a ROM 504, function button(s) 510, a card reader 508, and a cache 506. Microprocessor 502 can accept input from both function button(s) 510 and card reader 508. It can then access information from ROM 504 and access data from cache 506. Various messages, such as "locked", "unlocked", available balance, and the last few transactions can be displayed on display 500.

Figure 7:
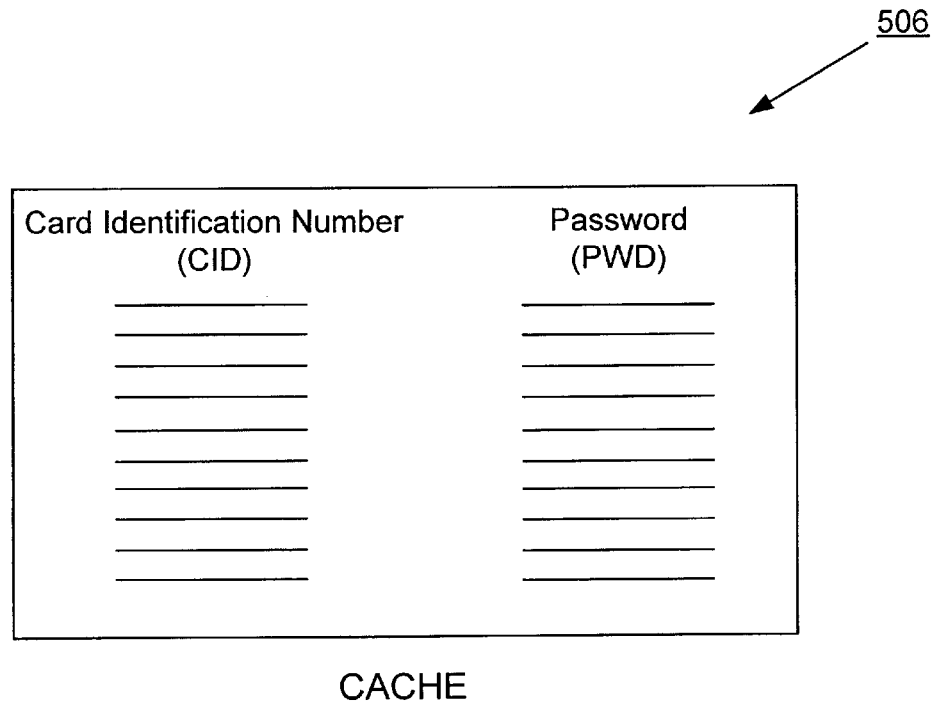
FIG. 7 is an example of a cache which may be used in conjunction with the smart card device shown in FIG. 6.

FIG. 7 shows an example of cache 506. Cache 506 can be a non-volatile memory such as an EEPROM or a FLASH memory. Preferably, cache 506 can include several passwords associated with several smart cards. Although the cache can contain a single password associated with a single smart card, the retention of several passwords associated with several smart cards allows for the flexibility of utilizing the same smart card device with several different smart cards. Those skilled in the art will recognize that cache 506 may be used to store other information as well. A card identification number (CID) assigned to each smart card uniquely identifies each smart card. Cache 506 can include a list of smart cards used in the most recent transactions. For example, the last ten smart cards utilized with a particular smart card device can be listed under CID, preferably with the most recent transaction listed at the top with the oldest transaction listed at the bottom. Associated with the CID are the passwords (PWD) listed in the same order. Accordingly, the first card ID and its associated password would be listed at the top of the list while the card ID of the smart card which was used in the oldest transaction and its password would be listed at the bottom of the list. When the cache is full, then the card ID and its associated password which is listed at the bottom of the list, i.e., the card which was used in the oldest transaction, would be removed. Further details regarding the generation and use of the CID and PWD will be given below.

According to embodiments of the present invention, during personalization or initialization of smart card 1208, the card issuer generates a derived password based on the card number and a master key. This password could be given to the cardholder, but the cardholder will most likely not need to memorize it for normal operation. The password is stored in smart card 1208 and is preferably not retrievable externally without using smart card device 1200 which can lock or unlock an application in smart card 1208. Upon reading this disclosure, those skilled in the art will recognize that entities other than the "card issuer" may be responsible for generating the derived password for use in the present invention. For example, an agent of the card issuer may generate the password. For simplicity, however, this specification will continue to refer to the "card issuer" as the entity generating a password.

There are many ways to generate a password for smart card 1208. One example of a method which can be used by the card issuer for generating a password for a card includes the use of Data Encryption Standard (DES) algorithm. The issuer can generate a DES cryptogram using a DES algorithm and a secret key. The issuer can encipher a unique serial number or identification number of the card and provide a unique binary number for each card. The binary number can be converted to a decimal number and a predetermined number of digits, such as the last six digits, can be used to produce a unique password for the smart card 1208.

To lock an application, the cardholder can place smart card 1208 into smart card device 1200 and request a locking function, for example, by pressing special function lock button 1204. Once the application is locked, the card can be safely given to another person, such as a waiter in a restaurant. When the card is returned, the cardholder can put smart card 1208 back into smart card device 1200 and press the unlock button, e.g., item 1204, to unlock the application which was previously locked. The smart card device reads the card ID from the card and uses the card ID to find the matching card ID and associated password in the cache 506 of smart card device. Smart card device 1200 then sends the password to smart card 1208 in an unlock command to unlock the locked application.

If the card holder forgets to bring his own smart card device 1200, he can borrow one from a family member or another trusted party. Any smart card device implemented with features of the present invention can lock any application in any smart card which has also been implemented in accordance with the present invention. Additionally, any smart card device 1200 according to the present invention that has previously locked a specific application in a specific smart card 1208 can unlock that application (within the limit of the cache storage capacity of the smart card device). If a card holder borrows a smart card device 1200 from a friend to lock an application in his smart card, the application can be unlocked with the friend's smart card device or with the cardholder's smart card device. This system and method allows family members or close friends to share smart card devices 1200 if they wish.

Any smart card device 1200 implemented according to the present invention which has the appropriate password for unlocking a given smart card application can unlock the application by sending an unlock command to the card. Normally, this will be done by the same smart card device that was used to lock the application in the smart card. If that smart card device is not available, the application in the smart card can be unlocked via a bank terminal, a PC, a telephone, or virtually any device with the capability to read and write information to a smart card, so long as the device is provided with the functionality described herein (e.g., the ability to generate lock and unlock commands per the present invention).

If required, (after appropriate identification), the password can be obtained from the card issuer after being easily generated by numerous well-known methods, such as Data Encryption Standard (DES), given the card ID. For example, an ATM can be programmed to display "card unlocking" as an option to its list of services. A user can then select the "card unlocking" service and allow the ATM to read information, including card ID, from the card. If the ATM already has the required DES key stored in its memory, then the card's password can be generated by the ATM. More likely, however, the ATM will need to contact a host computer which has access to the appropriate DES secret key (e.g., based on the card number and issuer). The ATM can send the card ID to the host computer which can regenerate the card's password. Alternatively, the host computer can read the card's password from a database. The resulting password can be returned to the ATM which can send an unlock command to the card using the password. A similar unlocking transaction can occur using a bank terminal, a PC, a telephone, or virtually any device with the capability to read and write information to a smart card.

Figure 8:
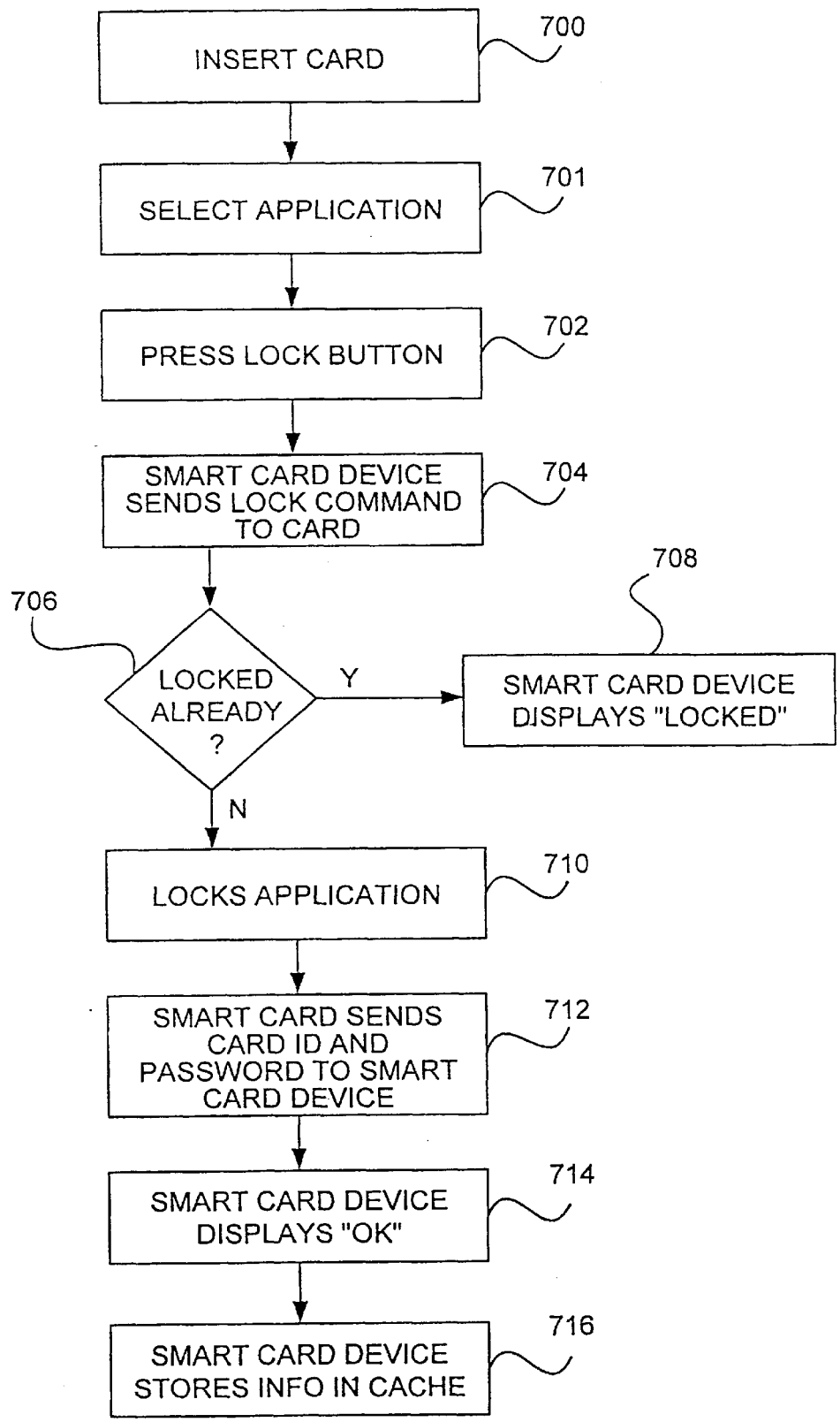
FIG. 8 is a flow diagram of a method according to an embodiment of the present invention for locking an application in a smart card.

FIG. 8 shows a flow diagram of a method according to an embodiment of the present invention for locking an application in a smart card. Smart card 1208 is inserted into smart card device 1200 (step 700), and a card application is selected (step 701). Once a card application is selected, commands are directed toward the selected application thereafter. A lock request is indicated (step 702). A lock button or split function button 1204 can be pressed by the cardholder to indicate the lock request. Smart card device 1200 sends a lock command to the smart card (step 704). It is then determined if the application in smart card 1208 is already locked (step 706). If it is locked then smart card device 1200 displays a message such as "locked" (step 708). Preferably, smart card device 1200 does not relock an application that has already been locked. Avoiding relocking an application that has already been locked ensures that no unauthorized person can simply relock the application thereby storing the password into his smart card device, then unlocking the application using the password which has just been stored.

If the application is not already locked (step 706) then the application is locked (step 710). Smart card 1208 sends the card identification (CID) and password (PWD) to smart card device 1200 (step 712). Smart card device 1200 then displays a predetermined message such as "OK" (step 714) and then smart card device 1200 stores the CID and associated PWD in its cache 506 (step 716).

Figure 9:
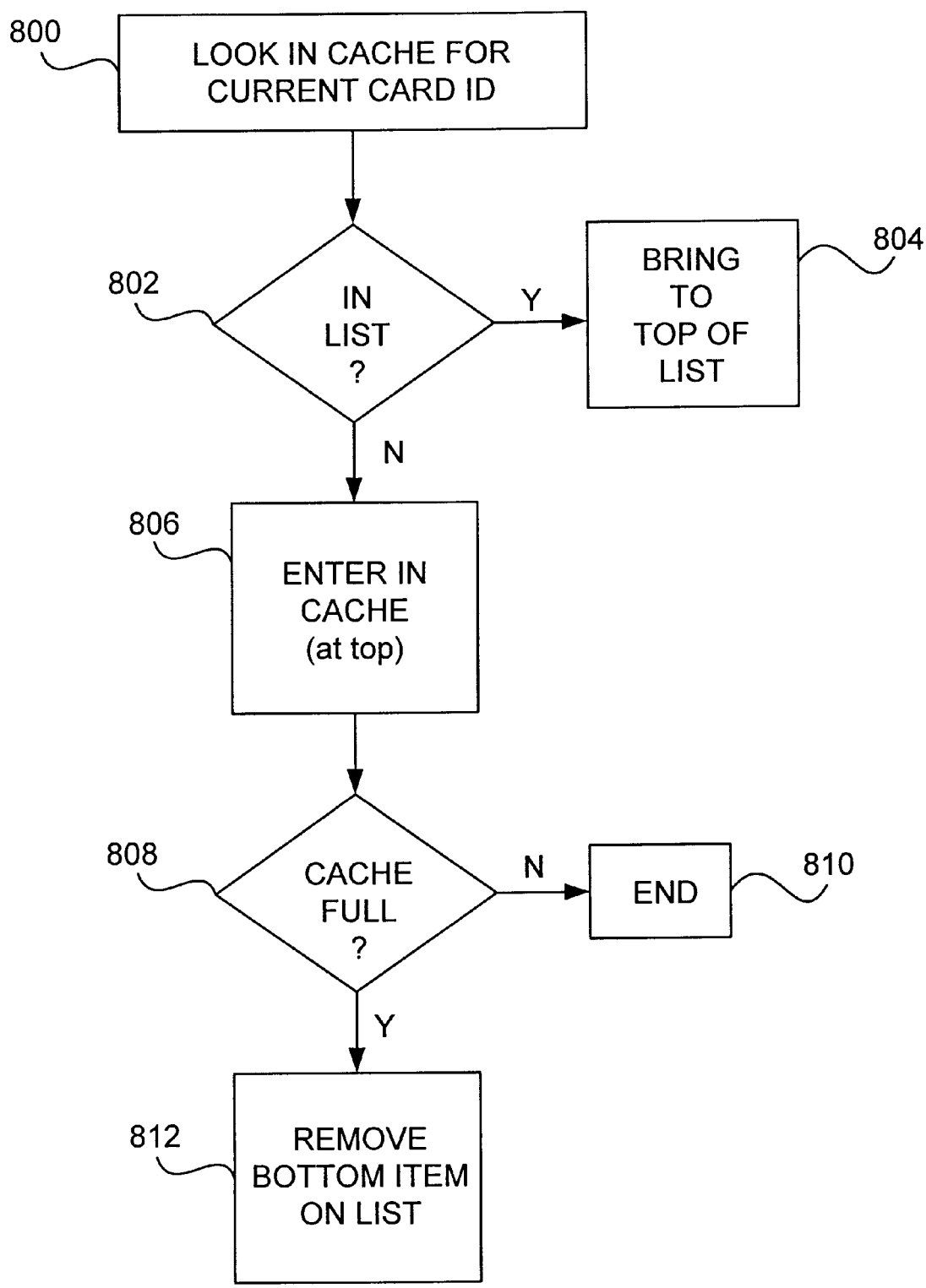
FIG. 9 is a flow diagram of a step of storing information in a cache as described in the method shown in FIG. 8.

FIG. 9 is a flow diagram for a method for storing information in cache 506 of smart card device 1200 as recited in step 716 of FIG. 8. The CID of the particular smart card is searched for in cache 506 of smart card device 1200 (step 800). If smart card device 1200 finds that the particular CID is in the cache (step 802), then that particular CID can be brought to the top of the list of CIDs (step 804). The list refers to the CID list shown in FIG. 7.

If the CID is not found in cache 506 (step 802), then it is entered in cache 506, preferably at the top of the CID list (step 806). It is determined if the cache is full (step 808) and if it is not then the process is complete (step 810). If, however, the cache is full then the bottom item on the list is removed (step 812). In this manner, a relatively small cashe size can be used to store the most recently used CID information. Those skilled in the art will recognize that other list approaches may also be used.

FIGS. 10A–10C show the preferred format for the command response and command header used in locking and unlocking a smart card according to the present invention. The preferred format is described in detail by the International Standards Organization (ISO) which defines the specific format for the command. ISO standard 7816-4, "Information Technology—Identification Cards—Integrated Circuit Cards with Contact Part 4" is herein incorporated by reference.

FIG. 10A shows a currently preferred format for the command used to lock or unlock a card. The format includes a command header (HDR) 800, followed by a data field, followed by a trailer (Le). FIG. 10B shows a currently-preferred format for a response to the command which includes optional data followed by the status (SW1, SW2). FIG. 10C shows a currently preferred format of command header 800. The format for command header 800 includes a class byte (CLA) followed by the instruction code (INS). P1 and P2 are in the third and fourth byte positions with P1 and P2 varying depending on the specific instructions given. After P1 and P2, is a field indicating the length of command data (Lc).

FIGS. 11A–11C illustrate examples of the command, the response, and the return codes for performing a locking function according to an embodiment of the present invention. In this example, the preferred format from the above-described ISO standard is used. FIG. 11A shows an example of a lock command which will be issued by, e.g., a smart card device as shown in FIG. 5A or 5B. In this example of a lock command, the class field (CLA) has a content value of a hex number "80", which in this case indicates that it is not a standard ISO instruction. The instruction is identified as a lock command by a hex number, such as "FF", and P1 and P2 both have "00" which can indicate that no parameters are to be sent. For the response to a lock command shown in FIG. 11B, smart card 1208 will generate a message including the CID (5 bytes) and the password (3 bytes). The return codes shown in FIG. 11C which will be generated by the card will include status word one (SW1) and status word two (SW2) with values of "9000" or "9110". "9000" indicates a successful lock of the application, while "9110" indicates that the application is already locked.

Figure 12:
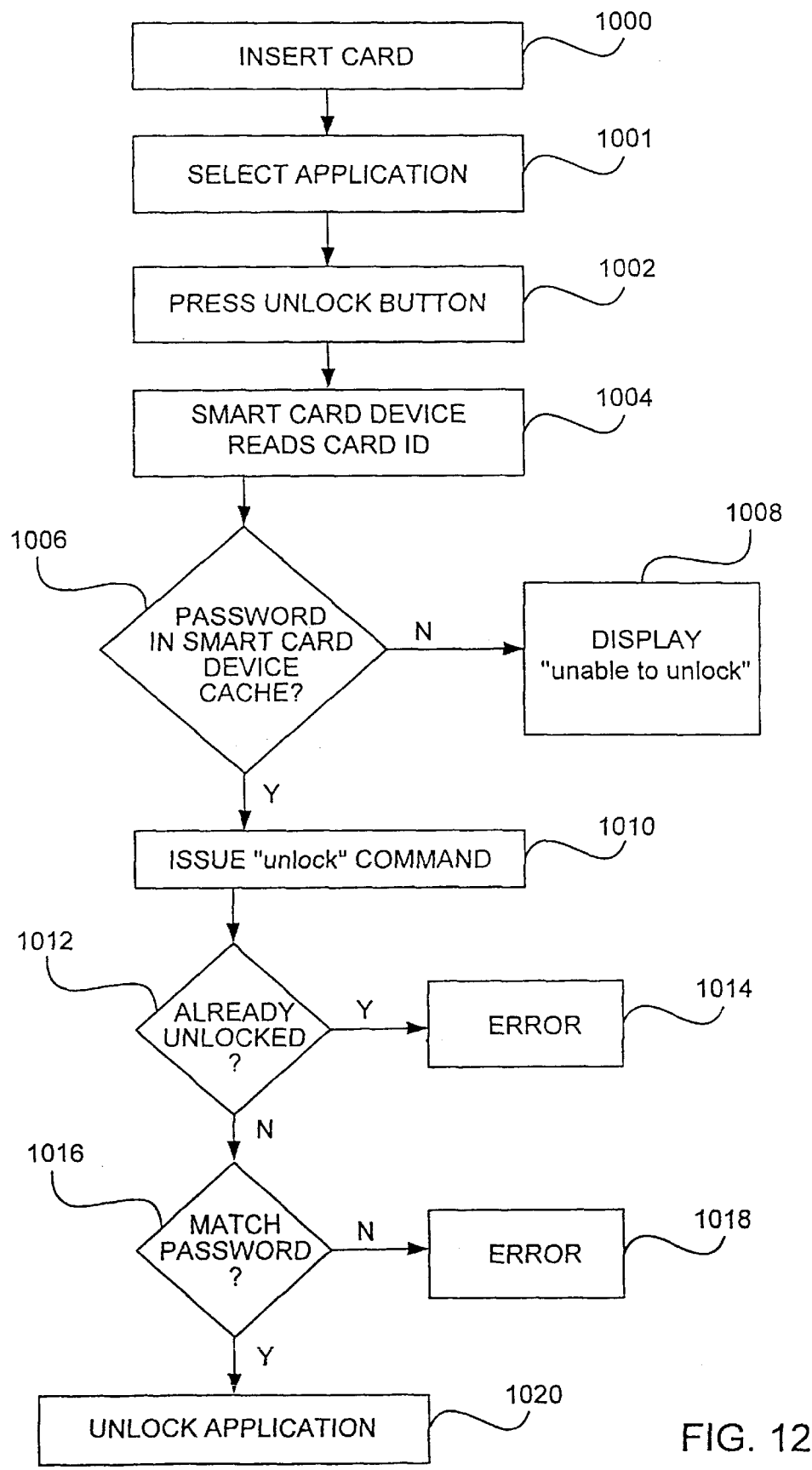
FIG. 12 is a flow diagram of a method according to an embodiment of the present invention for unlocking an application in a smart card.

FIG. 12 shows a flow diagram of a method according to the present invention for unlocking an application in a smart card 1208. Smart card 1208 is inserted into a smart card device 1200 in step 1000, and a card application is selected (step 1001). Once a card application is selected, commands are then directed to the selected application. An unlock button (or other means for initiating an unlock command) is then pressed (step 1002). The smart card device reads the CID in step 1004. Smart card device 1200 then determines whether the password associated with the CID is stored in the cache of the smart card device (step 1006). If the password is not stored in the cache then the smart card device is unable to unlock the smart card application and a message such as "unable to unlock" can be displayed (step 1008).

If, however, the password is found in the cache of smart card device 1200, then an "unlock" command is issued (step 1010). Smart card device 1200 then determines if the smart card application is already unlocked (step 1012). If the card application is already unlocked, then an error has occurred and an error message can be displayed to the card holder (step 1014). If, however, the smart card application has not already been unlocked, then device 1200 determines whether the password sent to the smart card through the "unlock" command matches the password associated with the smart card (step 1016). If it does not, then an error has occurred and the smart card application is not unlocked (step 1018). If, however, the password sent from the smart card device to the smart card matches the password associated with the smart card, then the application is unlocked (step 1020).

FIGS. 13A–13B illustrate an example of command and return codes for the unlock function. Again, it is preferable that the command formats set forth by the ISO standards be utilized. Accordingly, the example shown in FIG. 13A for the unlock command includes information related to the class, instruction, the parameters, and the length of data command. The example of the return codes shown in FIG. 13B include status word one (SW1) and status word two (SW2) including "9000" implying successful operation, "9111" implying that the application has already been unlocked, and "9112" implying that the application could not be unlocked because the smart card device either did not have the password or the password was incorrect.

A method and system for locking and unlocking an application in a smart card has been disclosed. Software written according to the present invention may be stored in some form of computer-readable medium, such as in computer memory, on a floppy or hard disk, or on a CD-ROM, transmitted over a network, and/or executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A smart card system comprising:
   a smart card defining one or more applications; and
   a smart card device configured to selectively lock or unlock a selective one of the applications on the smart card, the smart card device including:
      a card reader arranged to read from and to write to the smart card when inserted into the card reader;
      a memory coupled to the card reader, the memory including a card identification number corresponding to the smart card and a password corresponding to the card identification number;
      an input element configured to receive a lock or an unlock request to lock or unlock the selected application on the smart card when the smart card is inserted into the card reader; and
      a microprocessor coupled to the card reader and responsive to the input element, the microprocessor arranged to issue a lock command or an unlock command along with the password to lock or unlock the selected application on the smart card in response to the input device receiving the lock or unlock request and when the smart card provides identifying information matching the card identification number.

2. The system of claim 1, wherein the smart card device further comprises a display configured to display the status of the smart card when inserted into the card reader.

3. The system of claim 1, wherein the memory is a cache arranged to hold a plurality of card identification numbers and a corresponding plurality of passwords.

4. The system of claim 3, wherein the microprocessor is further configured to delete the oldest pair of the corresponding card identification number and password when the cache is full.

5. The system of claim 1, wherein the smart card device is a bank terminal, a personal computer, a telephone, or an automated teller machine.

6. A method of providing a smart card system comprising:
   providing a smart card defining one or more applications; and
   providing a smart card device configured to selectively lock or unlock a selective one of the applications on the smart card, the smart card device including:
      a card reader arranged to read from and to write to the smart card when inserted into the card reader;
      a memory coupled to the card reader, the memory including a card identification number corresponding to the smart card and a password corresponding to the card identification number;
      an input element configured to receive a lock or an unlock request to lock or unlock a selected one of the applications on the smart card when the smart card is inserted into the smart card reader; and
      a microprocessor coupled to the card reader and responsive to the input element, the microprocessor arranged to issue a lock command or an unlock command along with the password to lock or unlock the selected application on the smart card in response to the input device receiving the lock or unlock request and when the smart card provides identifying information matching the card identification number.

7. The method of claim 6, wherein the step of providing the smart card device further comprises the step of providing a display configured to display the status of the smart card when inserted into the card reader.

8. The method of claim 7, wherein the step of providing the memory further comprises the step of providing a cache arranged to hold a plurality of card identification numbers and a corresponding plurality of passwords.

9. The method of claim 8, wherein the step of providing the microprocessor further comprises the step of configuring the microprocessor to delete the oldest pair of the corresponding card identification number and password from the cache when the cache is full.

10. A smart card device configured to receive a smart card having one or more applications, the smart card device comprising:
    a card reader configured to receive the smart card;
    an application selection element configured to select one of the applications contained on the smart card when the smart card is inserted into the card reader;
    a lock and unlock element that enables the selective locking and unlocking of the selected application on the smart card when the smart card is inserted into the smart card reader; and
    a microprocessor coupled to the lock and unlock element, the microprocessor arranged to issue a lock command or an unlock command to the smart card when the lock and unlock element is activated and when the smart card has been identified by the smart card device.

11. The smart card device of claim 10, wherein the smart card device further comprises a input device configured to receive the lock or unlock request.

12. The smart card device of claim 10, wherein the smart card device further comprises a display configured to display the status of the smart card when inserted into the card reader.

13. The smart card device of claim 10, wherein the smart card device further comprises a memory arranged to hold a plurality of card identification numbers and a corresponding plurality of passwords associated with the smart cards inserted into the smart card device.

14. The smart card of claim 13, wherein the microprocessor is further configured to delete the oldest pair of the corresponding card identification number and password from the memory when the memory is full.

15. The smart card device of claim 10, wherein the smart card device is a bank terminal, a personal computer, a telephone, or an automated teller machine.

* * * * *